Oct. 11, 1927.
S. L. LEBBY
PROJECTOR
Filed May 20, 1924
1,645,063
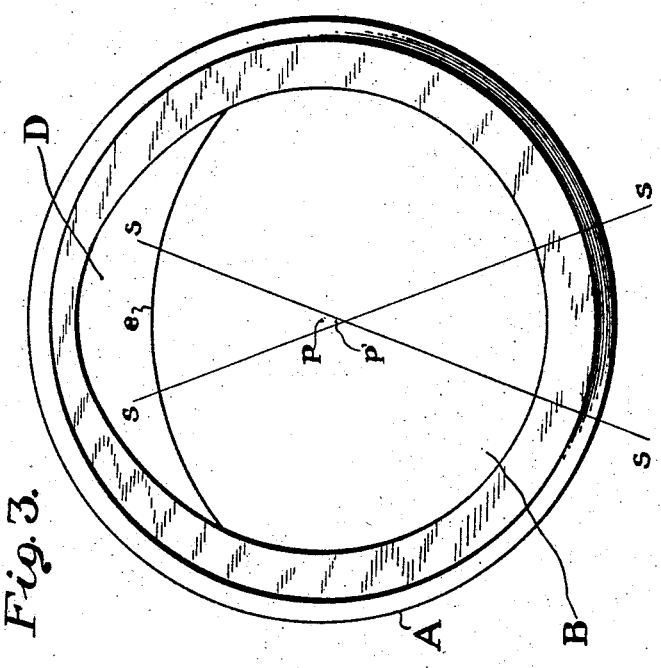
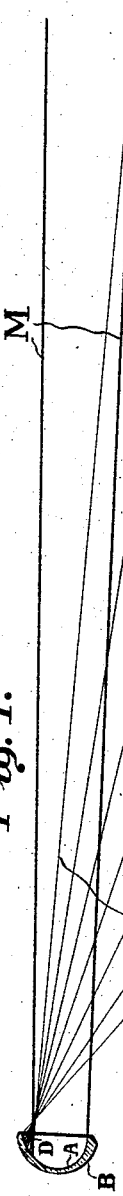
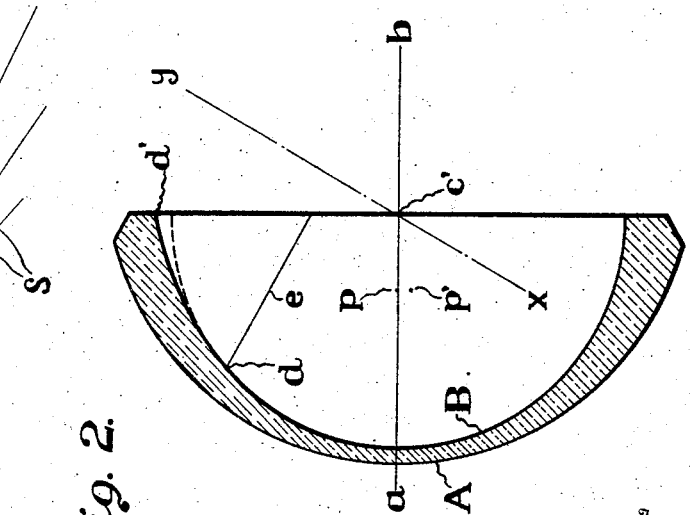
Inventor
*States Lee Lebby*
By *Loney & Cole*
Attorney Patented Oct. 11, 1927.

1,645,063

UNITED STATES PATENT OFFICE.

STATES LEE LEBBY, OF CORNING, NEW YORK.

PROJECTOR.

Application filed May 20, 1924. Serial No. 714,686.

For certain purposes a main beam of high intensity and small spread is desirable, in certain cases, however, such, for instance, as railway signals and automobile headlights, it is desirable to produce a secondary projection extending to a considerable angle from the main beam and having considerable depth. In railway signals this permits a closeup indication to be given to the engineer at points not covered by the main beam which is used for the distant indication, and in automobile headlights this is desirable for illuminating the road immediately in front of the machine. It is obvious, however, that to secure the maximum intensity of the secondary beam, without undue loss of intensity in the main beam, it should be confined in lateral spread to the field in which it is to be used and hence in certain cases, and particularly in railway signals, it is important to limit the lateral spread of such a beam.

I propose in my present application to use a projecting element in the form of a concave-meniscus lens having a reflecting rear surface of symmetrical curvature, the marginal portions of which are substantially corrected for spherical aberration, and to reduce the prism angle of a limited marginal portion of the element so that the convergence of the beam projected by such portion is increased vertically and furthermore to so shape such portion that this vertical spread of the secondary beam is accomplished without a corresponding increase of lateral spread of such beam. I have found that this can be accomplished by forming one of the faces of the element adjacent to the margin thereof as a surface of revolution other than a spherical surface and the best results I have obtained have been by making such portion with a surface which is a surface of a segment of an ellipsoid of revolution whose axis is oblique to the principal axis of the mirror.

Figure 1 is a vertical section through a mirror constructed in accordance with my invention, illustrating the projection of rays thereby as main and secondary beams from a point source.

Figure 2 is a diagram in vertical section illustrating the development in the vertical section of the mirror.

Figure 3 is a front view of the mirror resulting from the operation shown in connection with Figure 2.

In the present case I use a mirror of great depth, thereby giving to the reflecting convex face A, when considered by itself, a high aberration and uniformly correct this aberration at the margin throughout to an arc greater than 180° by the relation existing between the convex face A and the concave face B to project the desired concentrated beam M substantially symmetrical with the principal axis $a—b$, and locally modify the correction at a restricted portion of the margin by decreasing the prism angle at such portion, whereby the aberration due to the rear face at such portion causes the projection of rays convergent to the principal axis and the main beam and crossing the latter. This projection is indicated in Figure 1 by S.

In my preferred form the silvered convex face A is spherical and hence of symmetrical curvature, and this is also true of the concave face B, except for a portion thereof adjacent to the margin and extending through a limited arc in a plane transverse to the principal axis.

The light source P may be at the point of least confusion $p$ in the principal axis $a—b$ or slightly below as indicated at $p'$.

It will be noted that in diametrical section such a mirror as described is made up of two prismatic frustra oppositely disposed to each other, each frustra having circular front and back faces of sufficient obliquity to each other to give the desired spherical correction to the main beam projected thereby. To produce the downwardly directed secondary beam, I reduce the prism margin angle in a restricted circumferential zone D at the top of the mirror adjacent to the margin thereof, whereby a secondary beam S will be projected, consisting of rays projected at varying angles to and across the main beam M.

This variation of prism angle is by preference accomplished by shaping the concave face of the mirror, by rotating a portion of a conic curve around an axis in the vertical plane of the principal axis $a—b$ and inclined to the last named axis, and the line $d—d'$ bounding the surface D in vertical section is a portion of an ellipse whose major axis $x—y$ is inclined to the principal axis $a—b$ and such line is rotated around the axis $x—y$. Hence the surface D is a part of an ellipsoid of revolution.

By preference the axis $x—y$ of revolution on which the line $d—d'$ is rotated passes through the center of curvature $c'$ of the inner face and the line $d—d'$ is tangent to the spherical face B at its point of intersection therewith. Under the conditions the spherical surface B and the surface D will be tangent to each other throughout their line of intersection e.

It will be noted that the greatest reduction in prism angle is at the top of the mirror and hence at that point the maximum vertical convergence of the beam is produced, and that the prism angle when measured radially gradually increases on both sides of the vertical section until at some distance above the horizontal plane of the mirror it becomes the same as the angle of the main marginal prism. Thus every portion of the prism formed by the surface D outside of the vertical section has two components of refraction, one vertical and the other lateral, and hence such parts direct the rays so as to pass the main axis below the same as shown by s—s, Figure 3.

Having thus described my invention, what I claim is:—

1. A concavo-meniscus lens having a reflecting rear surface of symmetrical curvature, the marginal portions of which have a high spherical aberration and a concave face spherical throughout its greater extent to form with the rear face a marginal prism sufficient to substantially correct such aberration, and having a restricted marginal portion, formed by rotating a curve radially tangent to the spherical portion of the concave face around an axis intersecting the principal axis at the center of curvature of the concave face, forming with the rear face a prism of less angle and of less power of correction radially of the lens.

2. A concave-meniscus lens having a reflecting rear surface of symmetrical curvature, the marginal portions of which have a high spherical aberration and a concave face spherical throughout its greater extent to form with the rear face a marginal prism sufficient to substantially correct such aberration, and having a restricted marginal portion, formed by rotating a segment of an ellipse around an axis intersecting the principal axis at the center of curvature of the inner face, forming with the rear face a prism of less angle and of less power of correction radially of the lens.

3. A concave-meniscus lens having a reflecting rear surface of symmetrical curvature, the marginal portions of which have high spherical aberration and a concave face spherical throughout its greater extent to form with the rear face a marginal prism sufficient to substantially correct such aberration, and having a restricted marginal portion, formed by rotating a segment of an ellipse which is tangent to the concave face at its point of intersection therewith, around an axis of the ellipse intersecting the principal axis of the lens at the center of curvature of the concave face of the latter, such restricted marginal portion forming with the rear face a prism of less angle and of less power of correction radially of the lens.

4. A catadioptric mirror having a spherical rear surface, the larger portion of the inner surface also being spherical and a smaller and marginal portion thereof being ellipsoidal, the two portions being substantially tangent at their line of intersection.

5. A projecting element comprising a concave-meniscus lens having a reflecting rear surface, the marginal portions of which have high spherical aberration, the rear surface being spherical throughout and the front surface being spherical throughout its greater extent to form with the rear surface a marginal prism to substantially correct such aberration of the rear surface, the front surface having a restricted marginal portion forming with the rear surface a prism which has a less corrective angle than the remainder of such marginal portion.

6. A projecting element comprising a concave-meniscus lens having a reflecting rear spherical surface, the marginal portions of which have high spherical aberration, and a concave front face, spherical throughout its greater extent to form with the rear face a marginal prism of corrective angle sufficient to substantially correct such aberration, such front face having a restricted marginal surface of different curvature forming with the rear face a prism of less corrective angle, the two front surfaces being tangent to each other along their line of intersection.

7. A projecting element comprising a concave-meniscus lens having a reflecting spherical rear surface, and having a front surface spherical except for a portion of the margin thereof, such portion being of different curvature and being tangent to the front surface at their line of intersection and being defined by a curve rotated about an axis intersecting the principal axis of the lens.

In testimony whereof I hereunto affix my signature.

STATES LEE LEBBY.